United States Patent Office 3,042,657
Patented July 3, 1962

3,042,657
NEW SILICO-URETHANE PREPARATION
Douglas Peter Dodgson, Eastrigg, Riding Mill, England, assignor to Monsanto Chemicals Limited, London, England, a British company
No Drawing. Filed May 25, 1959, Ser. No. 815,328
8 Claims. (Cl. 260—77.5)

This invention relates to new silicon-containing compounds, and in particular to certain new compounds termed silico-urethanes.

It has been found that an organic isocyanate such as for instance toluene di-isocyanate can be reacted with an organic silicate containing a free hydroxyl group attached to the silicon atom to give what is termed a silico-urethane, that is to say a compound which is a silicate containing a urethane group.

The new silico-urethane of the invention is accordingly an organic silicate containing a urethane group linked to a silicon atom. Preferred silico-urethanes are polymeric bodies which are often solid, in which silicate residues are linked together through urethane groups.

The process of the invention is one for the preparation of a silico-urethane in which an organic silicate containing a hydroxyl group linked to a silicon atom is treated with an organic isocyanate.

The process of the invention is conveniently operated by using as the organic silicate a silicate having no initially free hydroxyl group but containing a substituent capable of being hydrolysed by water to give such a group, and then to employ this silicate in the presence of the calculated quantity of water to form the required number of hydroxyl groups by partial hydrolysis.

Suitable organic silicates from which the silico-urethanes of the invention can be derived are for instance simple esters such as Si(OR)₃OH or Si(OR)₂(OH)₂, where R is an organic group, for instance an alkyl group, such as an ethyl, propyl, butyl, octyl, nonyl, decyl or dodecyl group, or an aromatic group, such as a phenyl, tolyl or benzyl group. Specific examples are Si(OEt)₃OH, Si(OEt)₂(OH)₂, Si(O Octyl)₂(OH)₂, Si(OPh)₂(OH)₂, Si(OC₆H₄CH₃)₂(OH)₂ and Si(OEt)(OPh)(OH)₂. The corresponding condensed silicate esters are also operative, that is to say polysilicates containing an Si—O—Si bond and formed from monomeric silicates by condensation with elimination of water. A mixture of silicates can of course be employed.

The organic isocyanate preferably contains two or more isocyanate groups, although in certain instances monoisocyanate derivatives can be employed. Examples of compounds which give silico-urethanes having particularly useful properties are arylene di-isocyanates, such as for example toluene-2:4-di-isocyanate, toluene-2:6-di-isocyanate, and phenyl-1:4-di-isocyanate; other aromatic polyisocyanates such as 4:4′-di-isocyanato-diphenylmethane, 4:4′:4″-tri-isocyanatotriphenylmethane, 4:4′-di-isocyanatodiphenylpropane and toluene-2:4:6-tri-isocyanate can be used if desired. Aliphatic isocyanates can also be employed, particularly for instance alkylene di-isocyanates, for example hexamethylene di-isocyanate and propylene-1:2-di-isocyanate, as well as alkylidene di-isocyanates and cycloalkylene di-isocyanates. Mixtures of more than one isocyanate can be used.

Typical silico-urethanes of the preferred type, that is to say ones derived from an organic isocyanate having two or more isocyanate groups, comprise organic silicate residues (that is to say silicon atoms bearing organo-oxy groups, for instance ethoxy groups) linked together through urethane groups. Where the silico-urethane was derived from an aromatic di-isocyanate then the silicate residues are joined by urethane groups thus:

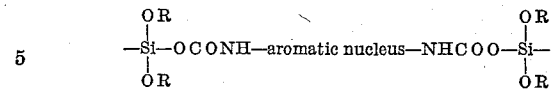

where

is the silicate residue and R is an organo group. Of course instead of the aromatic nucleus, which is preferably an arylene group such as for instance tolylene, there can be an aliphatic group, such as trimethylene. Specific silico-urethanes given by way of example contain the following groups:

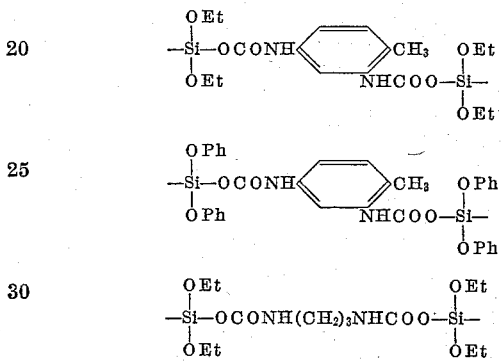

The silicate residue need not necessarily contain only one silicon atom, and may contain two or more joined by —Si—O—Si— bonds, for instance as in an organic polysilicate.

The structure of the silico-urethane depends of course on the number and position of the urethane groups, and in general the more hydroxyl groups present initially in the organic silicate starting material the more opportunity exists for urethane links to be formed by the isocyanate. The more heavily cross-linked products are solids of high melting point, if they melt at all, and they possess good electrical insulating properties.

The process of the invention can be carried out by simply mixing the hydroxyl-substituted organic silicate and the organic isocyanate together at a suitable temperature, which can be as low as room temperature. It is sometimes advantageous to heat the components together, up to perhaps 100° C. for instance, and it is often preferable to have a liquid diluent present, which should of course be inert to the organic isocyanate. Suitable liquid diluents are light petroleum, cyclohexane, benzene and toluene.

Where instead of using a hydroxyl-containing organic silicate as such this is to be formed in situ by partial hydrolysis of a silicate ester with the calculated quantity of water to give the desired number of hydroxyl groups the process variables given above are also applicable. If the silicate, water, and organic isocyanate are merely mixed together a slurry is initially formed, which then normally changes to a solid mass as first the necessary hydrolysis occurs and then the process of the invention. The silico-urethane can then be separated if necessary from any by-products formed by competing reactions. In general, in using this modification the silicate ester used needs of course to contain an organo-oxy substituent capable of being easily hydrolysed by water, for instance a lower alkoxy group such as an ethoxy or propoxy group. In addition the silicate can contain more stable groups, for instance a higher alkoxy group such as octyloxy, or an aryloxy group such as phenoxy or tolyloxy. Thus a silicate Si(OPh)₂(OEt)₂ can be employed with sufficient water to hydrolyse the ethoxy groups to give Si(OPh)₂(OH)₂

The invention is illustrated by the following example.

*Example*

This example describes the preparation of a solid silico-urethane from a hydroxyethoxysilane of the formula Si(OEt)₂(OH)₂ and toluene-2:4-di-isocyanate.

A mixture of 15.6 grams of tetraethyl orthosilicate (0.075 mols.), 2.7 grams of water (0.15 mols.), and 26.1 grams of toluene-2:4-di-isocyanate (0.15 mols.) was agitated by stirring to give a mobile slurry. On standing for 45 minutes at room temperature the slurry became solid. The solid was then powdered and extracted with ether in order to remove soluble by-products. The insoluble residue remaining weighed 30 grams and was a solid silico-urethane consisting of ethyl silicate residues linked by the tolylene bis(urethane) groups derived from the isocyanate. The silico-urethane contained about 3% by weight of combined silica and was insoluble in hydrocarbon and alcohol solvents, but was slightly soluble in chloroform, acetone and acetic acid. When heated to 150° C. the silico-urethane became soft, and it was found that fibres could be pulled from the softened material. On further heating for 20 minutes at 160° to 180° C. it was converted to a hard yellow solid which was infusible at 200° C., and was not readily soluble in any organic solvent. This latter product was presumably a more highly cross-linked silico-urethane obtained on heating by further reaction of residual isocyanate groups; it was unaffected by further heating and possessed good electrical insulation properties.

What I claim is:

1. The method of preparing a solid silico-urethane which comprises contacting at least one polyisocyanate of the group consisting of aryl diisocyanates, aryl triisocyanates, aliphatic diisocyanates and aliphatic triisocyanates with an ester of orthosilicic acid containing esterifying radicals of the group consisting of alkyl radicals having up to 12 carbon radicals, phenyl, tolyl and benzyl radicals; of which at least two of said radicals are readily hydrolyzable alkyl radicals of up to 3 carbon atoms, in the presence of the quantity of water required to hydrolyze the said readily hydrolyzable ester groups.

2. The method of preparing a solid silico-urethane which comprises contacting an arylene diisocyanate with a tetra-alkyl orthosilicate, wherein the alkyl radicals have up to 12 carbon atoms, at least two of which alkyl radicals have up to 3 carbon atoms, in the presence of the quantity of water required to effect the hydrolysis of the alkyl radicals having up to 3 carbon atoms.

3. The method of preparing a solid silico-urethane which comprises contacting an arylene diisocyanate with a tetra-alkyl orthosilicate at least 2 of which alkyl radicals have up to 3 carbon atoms, in the presence of the required quantity of water to effect the hydrolysis of the aliphatic radicals having up to 3 carbon atoms, heating said reaction mixture to a temperature above 100° C.

4. The method of preparing a solid silico-urethane which comprises contacting an arylene diisocyanate with a tetra-alkyl orthosilicate at least 2 of which alkyl radicals have up to 3 carbon atoms, in the presence of the water required to effect the hydrolysis of the aliphatic radicals having up to 3 carbon atoms, and heating the reaction mixture until an infusible polymer is formed.

5. The method of preparing a solid silico-urethane which comprises contacting tetraethyl orthosilicate and a toluylene-2,4-diisocyanate in the presence of sufficient water to hydrolyze at least two of the ethyl radicals and heating the reaction mixture until a resinous composition is formed.

6. The method of preparing a solid silico-urethane which comprises contacting diphenyl diethyl orthosilicate and toluylene-2,4-diisocyanate in the presence of sufficient water to hydrolyze the ethyl radicals, and heating the mixture until a resinous composition is formed.

7. The method of preparing a solid silico-urethane which comprises contacting an arylene diisocyanate and a tetraethyl orthosilicate in the presence of sufficient water to hydrolyze at least two of the ethyl groups, and heating the mixture until a resinous composition is formed.

8. The method of preparing a solid silico-urethane which comprises contacting diphenyl diethyl orthosilicate and a phenylene diisocyanate in the presence of sufficient water to hydrolyze the ethyl radicals, and heating the mixture until a resinous composition is formed.

References Cited in the file of this patent

UNITED STATES PATENTS 2,511,310    Upson _____ June 13, 1950

FOREIGN PATENTS 1,003,159    France _____ Nov. 14, 1951

OTHER REFERENCES

Astakhin et al.: "Doklady Akad. Nauk. S.S.S.R.," vol. 113 (1957), pp. 581–4 (51 Che. Abstracts 14, 582–3).

Rochow: "Chemistry of the Silicones," 1946, p 71, John Wiley and Sons, N.Y.

McGregor: "Silicones and Their Uses," 1954, p. 233, McGraw-Hill, N.Y.